Dec. 29, 1959  C. D. MILLER  2,918,826
CONTROL DEVICE

Filed Oct. 25, 1954  2 Sheets-Sheet 1

INVENTOR.
Carl David Miller

BY *Gray, Mase & Dunson*
ATTORNEYS.

Dec. 29, 1959
C. D. MILLER
CONTROL DEVICE
2,918,826
Filed Oct. 25, 1954
2 Sheets-Sheet 2
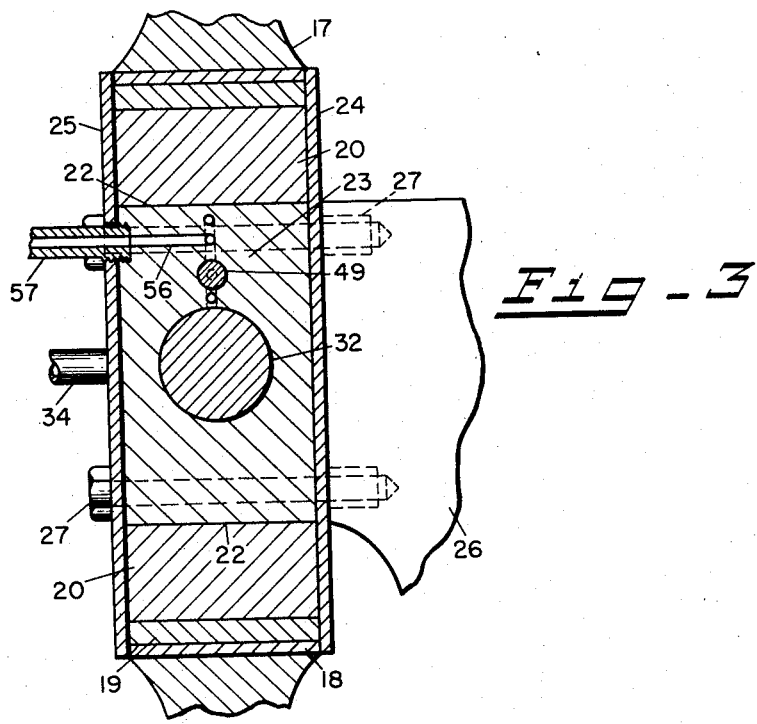
INVENTOR.
Carl David Miller
BY *Gray, Mase & Dunson*
ATTORNEYS.

United States Patent Office 2,918,826
Patented Dec. 29, 1959

2,918,826

CONTROL DEVICE

Carl David Miller, Columbus, Ohio, assignor, by mesne assignments, to The Cooper Bessemer Corporation, Mount Vernon, Ohio, a corporation of Ohio Application October 25, 1954, Serial No. 464,454

7 Claims. (Cl. 74—411)

This invention relates to a control device. More particularly, it relates to a control device wherein a fluid under pressure is used to sense fluctuations in a force and to operate fluid control means, which responsively controls the force. This control devcie is particularly advantageous when used in conjunction with gear transmissions for the control of torque fluctuations imposed on a driven gear member by a driving gear member.

Briefly, this control device comprises a housing having a cylindrical bore at one end, which may also serve as a support member for a gear of a transmission; a piston reciprocal in the cylinder bore, which, with the bore, provides a fluid chamber in the housing, and is connected to operating means outside the housing, which is subject to fluctuations in force that are to be controlled; a fluid inlet to the chamber; and a fluid outlet from the chamber which is provided with an adjustable valve, the adjustment of which is responsive to relatively long term variations in the average force to be controlled.

This control device operates through the use of a fluid supplied under pressure to the chamber to move the piston against a force when the force decreases, and to allow the force to move the piston in the opposite direction when the force increases. Fluid flow is controlled through the device by means of valves in the inlet and outlet. Fluid control means is provided over the action of the valve means to control on a relatively long-term basis the amount and direction of movement of the piston in response to fluctuating force minimums and maximums.

While the control device of this invention may be used in various types of equipment which require the control of forces, it is particularly advantageous in conditions where it is necessary to prevent fluctuating forces from reversing. In such conditions the control device of this invention may be used to control the fluctuating force in a range of positive values.

These conditions exist in a gear transmission wherein the driving gear is subject to force or torque fluctuations of a magnitude sufficient to cause loss of tooth contact between the driving and driven gear. This often occurs because the driven gear and equipment possess sufficient inertia to carry it ahead of the driving gear during recession to minimum torque. Even with modern methods of shaping gear teeth, this problem which is commonly known as "backlash" is acute in large high-power installations.

The control device of this invention provides an effective means of controlling the torque transmitted to the driven gear to a positive amount and thus to prevent backlash in gear transmissions. This is accomplished by providing fluid operated means of moving the center of rotation of either the driven or the driving gear substantially parallel to the tangent to the gear tooth pitch line at the point of contact between the gears.

Accordingly, it is an object of this invention to provide a control device that will respond to fluctuations in force to control the force by fluid means. It is an object to provide a control device that will respond to fluctuations in force to change the position of a piston in a cylinder and, thus, to control the force. It is a further object to provide a fluid piston-cylinder control device that will adjust for over-compensation in either direction of piston travel. It is still a further purpose to provide a fluctuating force control device for a power transmission that will control variations in torque from the driving member to the driven member.

It is a purpose of this invention to provide a torque control device for a gear transmission that is adapted by fluid means to prevent backlash between mating gear teeth. It is a further purpose to provide a fluid piston-cylinder control device of such compact design that it may be disposed in the hub of a gear in a gear transmission.

To these and other ends, this invention comprises apparatus a preferred form of which is disclosed in the following description and attached drawings. Although the apparatus and structure described and shown in detail refer with particularity to a control device in a gear transmission, it is apparent that this invention is not limited thereto, but may be used for other purposes where its features are advantageous.

In the drawings:

Fig. 3 is a sectional elevation view taken along the line 3—3 of Fig. 2.

Figure 2:
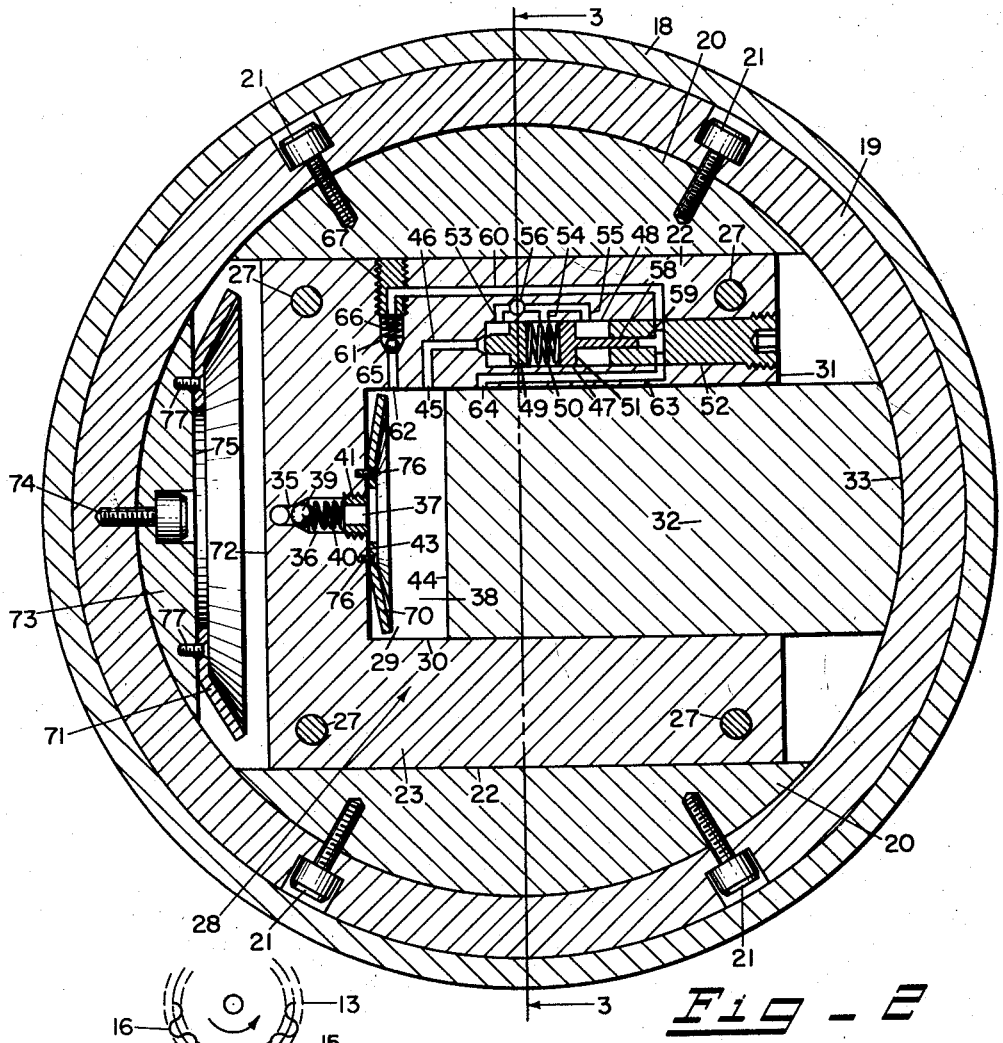
Fig. 2 is a sectional elevation view of the control device of this invention.
Figure 1:
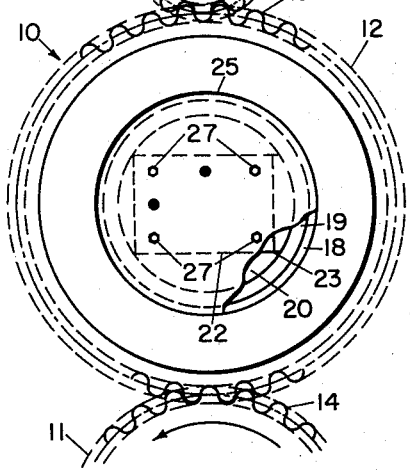
Fig. 1 is a partially diagrammatic elevation view of a gear transmission having a control device of this invention.

Referring to Fig. 1, a gear transmission designated generally as 10 comprises a driving gear 11, an intermediate gear 12, and a driven gear 13. Driving gear 11 has teeth 14 partially shown; intermediate gear 12 has teeth 15 partially shown; and driven gear 13 has teeth 16 partially shown. Intermediate gear 12 is provided with a hub portion 17 of increased cross-sectional area, as shown in Fig. 3. A babbitt lined bearing shell 18 is press-fitted into the hub portion 17. The bearing shell 18 is rotatably mounted on an annular axle member 19. A pair of oppositely disposed segments 20 are fastened within the inner perimeter of axle member 10 by suitable means such as screws 21, as shown in Fig. 2. The segments 20 are provided with oppositely disposed parallel bearing surfaces 22, which are adapted to slide transversely on a support block 23. The support block 23 serves also as a control-unit housing and a cylinder block.

Axial movement of the gear 12, bearing shell 18, axle member 19, and segments 20 is prevented by an inner retainer plate 24 and an outer retainer plate 25. The support block 23, retainer plate 24, and retainer plate 25 are held in assembly and fastened to a frame member 26 by a plurality of bolts 27. The frame member 26 may be any suitable portion of a gear-transmission assembly according to conventional practice.

The support block 23 forms a housing for a control unit, designated generally 28, as shown in Fig. 2. The support block 23 is provided with a transverse cylindrical bore 29 having a bore surface 30 in one end 31. A piston 32 is adapted to slide transversely in the cylinder bore 29 and is adapted to press against the axle member 19 at one end 33.

From the apparatus as described, it will be seen that as the piston 32 reciprocates in the cylinder bore 29, the axle member 19 with the segments 20 attached thereto slides transversely on the support block 23 at the bearing surfaces 22. In this manner the center of rotation of the gear 12 is moved transversely. When the amount of torque delivered by the driving gear 11 fluctuates and its angular velocity changes in correspondence to these fluctuations, the center of rotation of the gear 12 may move to the right or left to compensate. For instance, when the rotational speed at the pitch circle of the teeth 14 decreases in response to a decrease in torque of the gear 11, the gear 12 may be moved transversely in the direction opposite to the direction of tooth travel to prevent separation of tooth contact between teeth 14 and teeth 15. Backlash between the teeth 14 and the teeth 15 may thus be prevented.

The control unit 28 is housed in the support block 23. A fluid inlet tube 34 is connected to an inlet fluid passage 35 in the support block 23. Inlet passage 35 is connected through check valve means 36 to an inlet port 37 in a fluid chamber 38. The fluid chamber 38 is formed by the bore surface 30, an end 43 of the cylinder bore 29 and an end 44 of the piston 32. The check valve means 36 comprises a ball 39 urged by a spring 40 which is retained by threaded retainer means 41. An outlet port 45 is provided in the bore surface 30 spaced from the cylinder bore end 43. The outlet port 45 is connected by a fluid passage 46 to an adjustable valve mechanism designated generally as 47. The adjustable valve mechanism 47 comprises a valve bore 48, a valve closure member 49, adapted to reciprocate in the valve bore 48, resilient means such as a spring 50 and a valve piston 51. A plug 52 is provided as a closure means for the valve bore 48. The valve bore 48 is connected by fluid passages 53, 54, and 55 to a fluid outlet passage 56. The fluid outlet passage 56 is connected to a fluid outlet tube 57, as shown in Fig. 3.

The valve piston 51 is provided with a plunger portion 58 which is adapted to reciprocate in a plunger bore 59 in the plug 52. The plunger bore 59 is connected by a fluid passage 60 in the support block 23, through check valve means 61, to an aperture 62 in the bored surface 30, at a position spaced from the fluid outlet 45 toward the end 43 of the cylinder bore 29. A fluid passage 63 is provided from the bore plunger 59 to an aperture 64 in the bore surface 30 at a position spaced from the fluid outlet 45 away from the end 43 of the cylinder bore 29. The check valve means 61 preferably comprises a ball 65 urged by a resilient means such as a spring 66 which is held in position by a retainer means 67. It will be apparent that other check valve means of conventional practice may be substituted for the check valve means 36 and 61.

Resilient means such as a Belleville spring 70 is provided at the end 43 of the cylinder bore 29 to cushion over-travel of the piston 32 toward that end 43 in the event the fluid control unit 28 should fail. The Belleville spring 70 is fastened with flat-headed screws 76 or other suitable means. Similarly, a Belleville spring 71 is provided at one end 72 of the support block 23 to cushion over-travel of the axle member 19 toward the support block 23, in the event the fluid control unit 28 should fail. The Belleville spring 71 is fastened with flat-headed screws 77 or other suitable means. A segment 73 is fastened to the axle member 19 by a screw 74 or other suitable means. The segment 73 is provided with a flat surface 75 upon which the spring 71 is fastened.

The control unit of this invention operates in the following manner:

Assuming that the rotation of the driving gear 11, as seen in Fig. 1, is counterclockwise, force fluctuation maximums occur in a direction toward the left, and force fluctuation minimums will occur toward the right, in Fig. 2. Fluid under regulated constant pressure is supplied through the fluid inlet tube 34, check valve means 36, and inlet port 37 into chamber 38. When the force to the left begins to increase, the piston 32 and the gear 12 are moved slightly to the left. This increases the fluid pressure in the chamber 38 above the fluid inlet pressure and the check valve means 36 is thereby closed. When the fluid pressure in the chamber 38 reaches a value sufficiently high to overcome the urging of the valve spring 50, the closure member 49 moves to the right allowing fluid flow through the passages 46, 56, and outlet tube 57. The adjustable valve 47 is adjusted to a compression such that the valve closure member 49 moves to the right and opens when the fluid pressure in the chamber 38 represents the desired control force to the left. When the fluctuating force decreases, the piston 32 moves to the right, urged by the fluid pressure exerted by fluid entering the fluid port 37. The amount of movement of the piston to the right is controlled by the magnitude of the inlet fluid pressure, which is adjusted to provide sufficient movement to maintain tooth contacts between the gears 11, 12, and 13 in the gear train 10.

During the periods of operation when the average rotational speed of the gears in the gear train 10 is constant, the piston 32 reciprocates to the right and left alternately at each fluctuation to and from maximum and minimum force positions, respectively, maintaining a position approximately as shown in Fig. 2. However, during periods of acceleration and deceleration when the average speed of the gear train changes, the piston 32 travels farther to the right or left during one fluctuation cycle between force maximum and minimum than it does in the opposite direction. The adjustable valve mechanism 47 is provided to prevent this unequal movement from accumulating to the extent that spring 71 or 70 is engaged.

As a first example, the condition wherein the gear train 10 is accelerating and the piston works its way to the left, is considered. In this case, when the piston moves far enough to the left to partially cover the outlet port 45, the fluid pressure is substantially increased to the point that the check valve means 61 is opened allowing this higher pressure fluid to pass through fluid passage 60 and 59, urging plunger 58 and piston 51 to the left. This increases the compression in spring 50 which in turn, increases the pressure at which valve closure member 49 opens providing for decreased movement of the piston 32 to the left at each maximum force fluctuation.

Considering the second condition when the gears of the gear train 10 are decelerating and the piston works its way to the right, it will be seen that the adjustable valve mechanism 47 has the opposite effect. When the piston 32 works its way to the right to a position such that the aperture 64 is uncovered and open to the fluid chamber 38, higher pressure fluid will drain from behind the plunger 58 through the passage 63 and out aperture 64 into the fluid chamber 38. This decreases the compression in spring 54 and lowers the chamber 38 pressure at which the valve insert 49 will open at each force fluctuation to minimum.

When periods of acceleration and deceleration are completed and the average speed of the gear train 10 becomes constant, the piston oscillates to the right and left in accordance with force fluctuations at a position between the fluid outlet 45 and the aperture 64 in the cylinder bore 29.

In the event that the adjustable valve mechanism should fail to operate and the piston should travel further to the right than necessary to uncover the aperture 64, travel will be limited by compression of the Belleville spring 71. In the event that the piston should travel further to the left than is necessary to uncover the outlet port 45, further travel will be limited by the Belleville spring 70.

It is preferred that the fluid used in the control unit be a liquid, because the control unit 28 has greater sensitivity due to the relative incompressibility of a liquid. However, in some circumstances, other fluids may be adequate.

In the device of this invention, the energy required to effect the force control is supplied through the fluid admitted through the fluid inlet tube 34. This energy is partially expended in the control unit 28. That which is not used is released through the fluid passing out through the outlet tube 57.

In the past, backlash control devices wherein the center of rotation of a gear is moved transversely in a manner similar to the device of this invention have been used; however, in such prior devices a resilient member, such as a coil spring, is provided to react to fluctuating forces. In these prior devices, the spring stores the energy during the maximum force portion of the fluctuating force cycle and releases this energy to shift the center of rotation of the gear transversely against the decreasing force during the minimum portion of the cycle. Such "spring" operated devices are characterized by the disadvantage that the natural frequency of oscillations of the spring member may be in resonance with the force fluctuations at some rotative gear speeds. This has a tendency to cause excessive vibration unless dampening means is provided for the spring member. The provision of dampening means for the spring member reduces the sensitivity of the device without providing for adjustment for various rotative speeds. The device of this invention overcomes these characteristics of prior devices by providing a control unit which adjusts to meet changing force conditions caused by variations in average rotative speeds of the power transmission. Further, a spring element of prior devices is necessarily large in comparison to the control unit of this invention when equal force capacities are considered. The fluid-operated control unit of this invention is relatively compact in comparison and may be adapted to fit into the hub of a conventional sized gear.

The adjustable valve mechanism 47 is shown having resilient means 50 provided between closure member 49 and piston 51. It is apparent that the adjustable valve of this invention may have a spring of any convenient degree of resilience. The spring may be made so stiff that it is in effect equivalent to a substantially nonelastic member.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitations, and that various changes such as changes in shape, relative size, and arrangement of parts, may be substituted without departing from the spirit or scope of the invention herein disclosed.

What is claimed is:

1. A device for controlling operative means having fluctuating force characteristics in opposite directions comprising: a cylinder block; a piston reciprocable in said cylinder block, providing a fluid chamber in said cylinder block and connected to said operative means outside said cylinder block; a fluid inlet to said chamber connected to a source of fluid under pressure, and entering said chamber; a fluid outlet to said chamber provided with adjustable valve means operable to modulate the flow of fluid through said outlet; and a fluid communication means between the adjustment means of said valve and a position in said chamber that is longitudinally removed from an optimum position of said piston as moved by said fluctuating force in one direction, and a second fluid communication means between the adjustment means of said valve and a position in said chamber that is longitudinally removed from the optimum position of said piston as moved by said fluctuating force in the opposite direction, said optimum positions of said piston being between said fluid communication means positions in said chamber; said communication means to adjust said valve and modulate flow therethrough in accordance with the pressure in said chamber as the piston progresses in either of said opposite directions; said fluid inlet to said chamber being located longitudinally without the portion of said chamber embraced by said fluid communication means positions.

2. A control device according to claim 1 wherein said fluid inlet is provided with check-valve means.

3. A control device according to claim 2 wherein said adjustable valve means comprises a closure member positioned with respect to a seat by fluid pressure in said chamber.

4. A control device according to claim 3 wherein said closure member is resiliently urged by a compression spring having its tension adjusted by fluid pressure in said chamber.

5. A torque fluctuation control device for gear transmissions having a driving gear, a driven gear and an intermediate gear mounted in driving relation on a frame comprising: axle support means fastened to said frame, slidably supporting an axle of said intermediate gear for lateral movement, and having a cylinder bore at one end thereof; piston means reciprocal in said cylinder bore, providing a fluid chamber in said support means, and connected to said axle; fluid inlet and outlet control means to said chamber operated responsively by fluid pressure to fluctuations in said torque provided by said driving gear to change the position of said piston means in said cylinder means and to laterally change the position of said axle on said support means to control said torque.

6. A device for controlling operative means having fluctuating force characteristics in opposite directions comprising: a housing having a cylinder bore at one end; a piston reciprocal in said cylinder bore providing a fluid chamber in said housing and connected to said operative means; a fluid inlet passage to said chamber at one end of said cylinder bore having check valve means to prevent fluid back-flow through said inlet; a fluid outlet passage from said chamber; an adjustable valve assembly in said fluid outlet passage comprising a valve closure member reciprocable in said housing to restrict said outlet passage; a fluid passage from said chamber, at a position longitudinally spaced from said fluid outlet toward said one end of said cylinder bore, to the controlling end of said closure member; and a second fluid passage from the controlling end of said closure member into said chamber at a position spaced from said fluid outlet longitudinally away from said one end of said cyinder bore.

7. A device for controlling operative means having fluctuating force characteristics in opposite directions comprising: a housing having a cylinder bore at one end; a piston reciprocal in said cylinder bore providing a first fluid chamber in said housing and connected to said operative means; a fluid inlet passage to said first chamber at one end of said cylinder bore having check valve means to prevent fluid back-flow through said inlet; a fluid outlet passage in said cylinder bore from said first chamber; an adjustable valve assembly in said fluid outlet passage comprising a valve closure member reciprocable in said housing to restrict said outlet passage, and a second piston in a second chamber in said housing operable to move and adjust said valve closure member; a fluid passage from said first chamber, at a position longitudinally spaced from said fluid outlet toward said one end of said cylinder bore, to said second chamber; and a second fluid passage from said second chamber into said first chamber at a position spaced from said fluid outlet longitudinally away from said one end of said cylinder bore.

References Cited in the file of this patent

UNITED STATES PATENTS

| | | |
|---|---|---|
| 1,134,608 | Gottschalk | Apr. 6, 1915 |
| 2,225,515 | Wood | Dec. 17, 1940 |
| 2,378,417 | Linsley | June 19, 1945 |
| 2,386,367 | Taylor | Oct. 9, 1945 |
| 2,467,434 | Kupiec | Apr. 19, 1949 |
| 2,640,428 | Houghton | June 2, 1953 |